(12) United States Patent
Lee et al.

(10) Patent No.: US 7,562,107 B2
(45) Date of Patent: Jul. 14, 2009

(54) MIXED-TYPE ADDER COMPRISING MULTIPLE SUB-ADDERS HAVING DIFFERENT CARRY PROPAGATION SCHEMES

(75) Inventors: Jeong-A Lee, Gwangju (KR); Ki-Seon Kim, Gwangju (KR); Jeong-Gun Lee, Chuncheon-Si (KR); Suk-Jin Kim, Mapo-gu (KR)

(73) Assignee: Gwangju Institute of Science and Technology, Kwangju (KR)

( * ) Notice: Subject to any disclaimer, the term of this patent is extended or adjusted under 35 U.S.C. 154(b) by 667 days.

(21) Appl. No.: 11/134,615

(22) Filed: May 19, 2005

(65) Prior Publication Data

US 2006/0089961 A1    Apr. 27, 2006

(30) Foreign Application Priority Data

Oct. 22, 2004   (KR) ...................... 10-2004-0085014

(51) Int. Cl.
*G06F 7/50*      (2006.01)
(52) U.S. Cl. ..................................... 708/706
(58) Field of Classification Search .......... 708/700–714
See application file for complete search history.

(56) References Cited

U.S. PATENT DOCUMENTS

| | | | |
|---|---|---|---|
| 6,832,235 B1* | 12/2004 | Muramatsu et al. | ......... 708/710 |
| 7,016,932 B2* | 3/2006 | Kantabutra et al. | ......... 708/712 |
| 2005/0177611 A1* | 8/2005 | Awaka et al. | ............... 708/706 |

* cited by examiner

*Primary Examiner*—Tan V Mai
(74) *Attorney, Agent, or Firm*—TIPS Group

(57) ABSTRACT

Disclosed is a mixed-type adder with optimized design costs. The mixed-type adder includes I sub adders, (where, I is a positive number larger than 1). An overall bit width of the mixed-type adder is divided into I bit groups which are respectively allocated to the I sub adders. The I sub adders have different carry propagation schemes and are connected in series through a carry signal.

5 Claims, 5 Drawing Sheets

MIXED-TYPE ADDER COMPRISING MULTIPLE SUB-ADDERS HAVING DIFFERENT CARRY PROPAGATION SCHEMES

CROSS REFERENCE TO RELATED APPLICATION

This application claims priority from Korean Patent Application No. 2004-0085014, which was filed on Oct. 24, 2004.

BACKGROUND OF THE INVENTION

1. Field of the Invention

The present invention relates to a digital integrated circuit for performing an arithmetic operation, particularly, an adder, and more particularly to an adder with optimized design costs.

2. Description of the Related Art

A binary adding operation, which is most frequently used in digital systems, plays an essential role in designing general-purpose processors, special-purpose processors such as digital signal processors, and almost all application-specific integrated circuits (ASIC). Moreover, since an adder, which is a basic element for performing large-scale, complicated operations, such as multiplication, division, and floating-point operations, is used in various design units such as a memory address generator or a program counter, it is an important design issue to develop binary adders with optimal design costs.

Numerous studies on various kinds of carry propagation schemes, which are a main design factor of the digital system, taking into consideration operation speed of circuits, amount of silicon used, and power consumption according to design goals, have been conducted. Until high performance adders were developed, early digital systems used a ripple carry adder of the simplest form. FIG. 1 is a block diagram of the ripple carry adder. Equations 1 and 2 are equations for signals $s_i$ and $c_i$ using signal bits $x_i$ and $y_i$ shown in FIG. 1.

$$s_i = x_i \cdot y_i \cdot c_i' + x_i' \cdot y_i \cdot c_i' + x_i' \cdot y_i' \cdot c_i + x_i \cdot y_i \cdot c_i \quad \text{Equation 1}$$

$$c_i = x_i \cdot y_i + x_i \cdot c_i + y_i \cdot c_i \quad \text{Equation 2}$$

In the above equations, a symbol '+' represents a binary OR operation, and a symbol '·' represents a binary AND operation. A symbol "'" is a unary operator for performing a binary NOT operation. Although the ripple carry adder can perform an add operation using a small quantity of silicon, it is very slow in performing the add operation since carry propagation in the adder is linear.

For a higher speed adder, there are many cases where a carry prediction circuit is used to accelerate carry generation and propagation, or a carry propagation path for faster carry propagation is implemented with a multi-layered binary tree structure. A high speed adder commonly used includes a carry skip adder, a carry select adder, a carry lookahead adder, etc. In such adders, the amount of silicon circuits used has been increased in correspondence with increased speed of the add operation.

When an adder is implemented with a multi-layered structure, various carry propagation schemes are applicable to different layers. As suggested in "Carry-Lookahead/Carry-Select Binary Adder, U.S. Pat. No. 5,508,952, Apr. 16, 1996" and "Adder Which Employs Both Carry Look-Ahead and Carry Select Techniques, U.S. Pat. No. 5,898,596 Apr. 27, 1999", a mixed-type adder, which includes a carry generation layer employing a carry lookahead scheme for high speed carry propagation and a sum generation layer employing a carry select scheme for calculating a sum quickly through carry prediction, has been used for high speed add operations. FIG. 2 is a diagram illustrating a structure of a mixed-type adder employing both the carry lookahead scheme and the carry select scheme.

In conventional adder designs, a single carry propagation scheme has been mainly used, and many different optimization techniques including an optimization at a transistor level, application of an asynchronous design scheme, an optimization of a bit width employing the carry prediction scheme, etc., have been applied to adders employing the signal carry propagation scheme. However, as a mixed-type adder employing a multi carry propagation scheme, there is merely an adder employing only two schemes, the carry prediction scheme and the carry select scheme, applied to different layers. Such a design scheme is restricted in its application range in that the number of combinable carry propagation schemes is few and an applicable adder must have a multi-layered structure.

In FIG. 3, solid lines represent trade-off design spaces for a relationship of delay time-amount of used circuits of an adder, which is attained when a conventional adder structure is used. Delay time-amount of used circuits curves showing trade-off characteristics are formed depending on the kind of adder, and curvatures of the delay time-amount of used circuit curves can be determined by a degree of optimization applied to each adder. Each of delay time-amount of used circuits curves has an ideal banana-shaped inverse-proportional plot. However, when trade-off characteristics for the adder design with no restriction on a particular adder structure are calculated, the delay time-amount of used circuits curves do not have the ideal banana-shaped inverse-proportional plot if each of the delay time-amount of used circuit curves forms a single delay time-amount of used circuit curve.

The delay time-amount of used circuit curves have a non-ideal stepped trade-off curve from an overall point of view. Since the delay time and the amount of used circuits do not have an accurate inverse-proportional relationship in such a non-ideal trade-off curve, even when restrictions on the delay time of adder are alleviated, the amount of used circuits cannot be reduced, which results in ineffective optimization of the adder design. Accordingly, there is a need for a method for obtaining an ideal and effective trade-off curve, as indicated by a dotted line in FIG. 3, in optimization of the relationship of the delay time and the amount of used circuits.

SUMMARY OF THE INVENTION

The present invention has been made in view of the problems of the conventional method, and it is an object of the present invention to provide an adder with optimized design costs.

It is another object of the present invention to provide an optimized adder not present in an exiting IP library by adjusting bit width parameters of a plurality of single carry propagation scheme IPs and integrating these IPs.

It is yet another object of the present invention to provide an adder optimized such that an optimal design space has a delay time-amount of used circuits curve plotted by a dotted line in FIG. 3.

It is yet another object of the present invention to provide a mixed-type binary adder of a multi carry propagation scheme with an optimal design space.

In accordance with an aspect of the present invention, the above and other objects can be accomplished by the provision of a mixed-type adder including I sub adders, (where, I is a positive number larger than 1), wherein an overall bit width of the mixed-type adder is divided into I bit groups which are respectively allocated to the I sub adders, the I sub adders having different carry propagation schemes and connected in series through a carry signal.

Preferably, each of the sub adders composing the mixed-type adder is a mixed-type binary adder or a mixed-type adder having a different digital representation.

Preferably, the mixed-type adder uses an adder intellectual property (IP) having bit width parameters adjusted such that the sum of width of I bits is the overall bit width.

Preferably, the mixed-type adder satisfies the following condition to minimize the amount of used circuits (A):

$$1bT \leq T \leq ubT$$
$$n = \sum_{i=0}^{I} n_i$$

where ib T is the minimal delay time, ub T is the maximal delay time, T is an add operation delay time of the mixed-type adder, n is the overall bit width, and $n_i$ is a bit width of each sub adder.

Preferably, the mixed-type adder satisfies the following condition to minimize an add operation delay time (T):

$$1bA \leq A \leq ubA$$
$$n = \sum_{i=0}^{I} n_i$$

where ib A is the minimal amount of used circuits, ub A is the maximal amount of used circuits, A is the amount of used circuits of the mixed-type adder, n is the overall bit width, and $n_i$ is a bit width of each sub adder.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the accompanying drawings.

Figure 4:
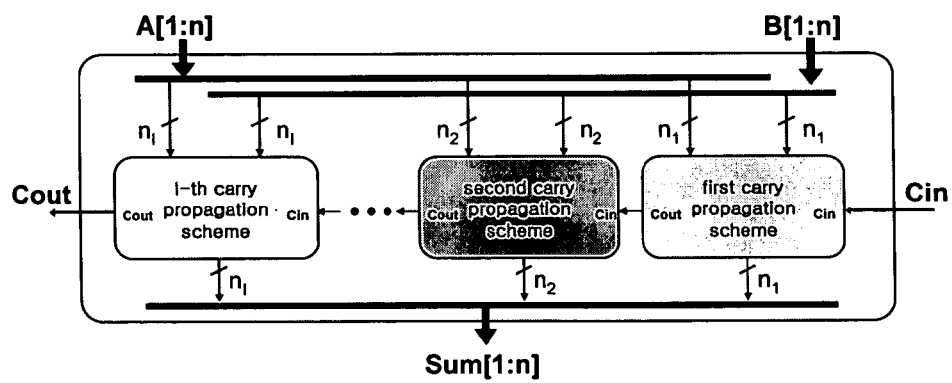
FIG. 4 is a block diagram of a mixed-type binary adder employing a multi carry propagation scheme according to the present invention.

FIG. 4 is a block diagram of a structure of a mixed-type binary adder of a multi carry propagation scheme according to a preferred embodiment of the present invention. A mixed-type binary adder of a multi carry propagation scheme has a structure wherein a plurality binary adders of a single carry propagation scheme are connected to each other by means of carry signals. An n-bit adder having a structure where a plurality ('I' in the figure) of sub adders designed according to different carry propagation schemes are connected in series receives two numbers A and B, each having n bits, and a carry input signal $C_{in}$ and calculates a sum output signal Sum, which represents a sum of the two numbers, and a carry output signal $C_{out}$.

In the structure of the mixed-type binary adder according to the present invention, the overall bit width of an adder to be designed is divided into a plurality of bit groups, $n_1, n_2, \ldots, n_I$, to which particular carry propagation schemes are applied. FIG. 4 shows a carry propagation scheme applied to each sub adder and a bit width assigned to each sub adder. With such a bit level, by mixing carry propagation schemes having different design costs, an adder structure giving a sufficient satisfaction to given design restriction conditions can be created.

Figure 5:
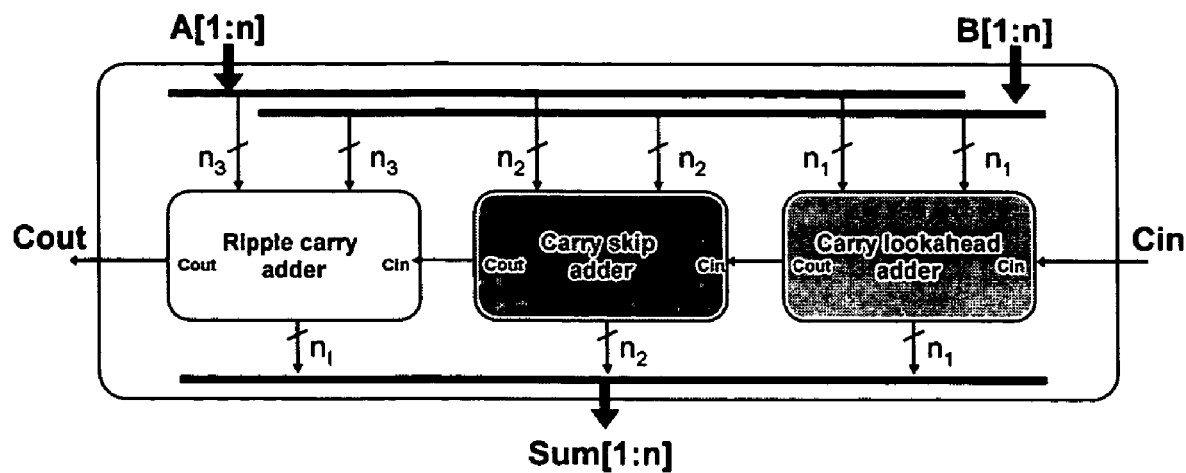
FIG. 5 is a schematic block diagram of an adder according to a preferred embodiment of the present invention.

FIG. 5 is a schematic block diagram of a mixed-type adder according to a more detailed embodiment of the present invention. The mixed-type binary adder of the multi carry propagation scheme as shown in FIG. 5 has a structure where three sub adders, i.e., a ripple carry adder, a carry skip adder, and a carry lookahead adder, are connected in series by means of a carry signal. Of course, the sub adders employable for implementing the mixed-type adder according to the present invention are not limited to this.

As shown in FIG. 5, the carry lookahead adder has an $n_1$ bit width, the carry skip adder has an $n_2$ bit width, and the ripple lookahead adder has an $n_3$ bit width. Here, it is obvious that $n_1+n_2+n_3=n$. If a bit width $n_i$ of a sub adder is 0, the sub adder is implemented by a single wire for propagating a carry signal of an $n_{i-1}$-th sub adder to an $n_{i+1}$-th sub adder.

Figure 6:
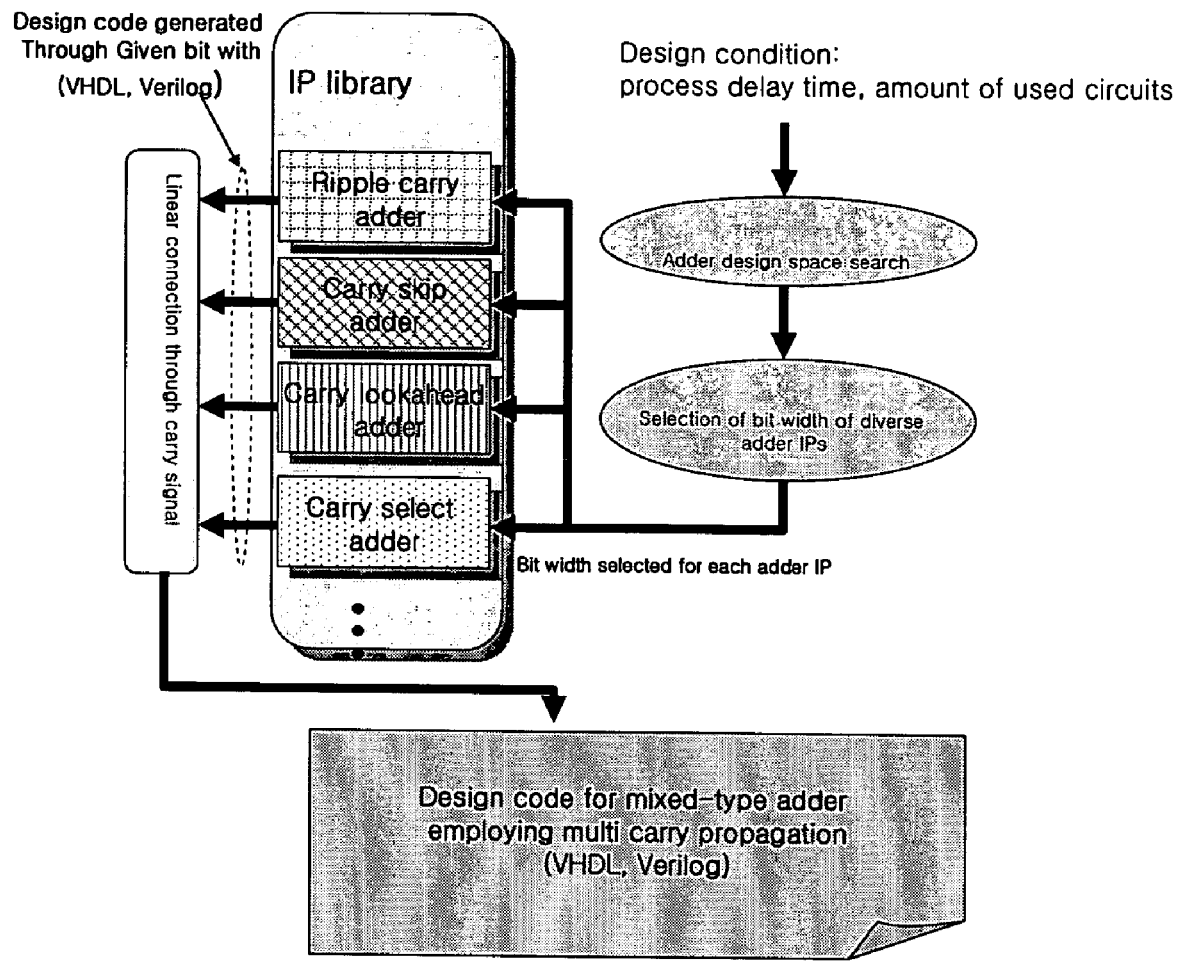
FIG. 6 is a flow chart illustrating a design of a mixed-type binary adder employing a multi carry propagation scheme using an adder IP of an IP library according to a preferred embodiment of the present invention.

In addition, preferably, the structure of the mixed-type binary adder of the multi carry propagation scheme according to the present invention can be designed using various adder intellectual properties (IP) in an IP library. FIG. 6 is a diagram showing a design flow for the mixed-type binary adder of the multi carry propagation scheme using the adder IPs in the IP library. The mixed-type binary adder of the multi carry propagation scheme according to the present invention can be configured using the IP library by sequentially connecting adder codes (soft IPs prepared using design languages such as VHDL or Verilog), which are generated after adjusting bit width parameters of the binary adders of various single carry propagation schemes present in the existing IP library, by means of the carry signal. In this case, the sum of bit widths of the sub adders of the single carry propagation schemes, which are generated from the existing IP library, must be equal to a bit width of a mixed-type binary adder to be designed.

As shown in FIG. 4, if 'I' carry propagation schemes are used for the mixed-type binary adder of the n-bit multi carry propagation scheme, by adjusting each bit width parameter such that the sum of bit widths of I adder IPs having respective carry propagation schemes becomes n, the adder IPs can be optimally generated according to given design conditions.

The optimization of the structure of the mixed-type binary adder employing the multi carry propagation scheme according to the present invention can be attained according to two methods as follows.

A first method is to design the structure of the mixed-type binary adder such that the amount of used circuits is minimized under given restrictions on delay time. That is, the amount of used circuits is minimized by positioning a process time of an adder on a particular time interval. Such a design is used when an adder circuit optimized for a preset cycle time is designed after a cycle time of a system to be designed is fixed.

A process time of the mixed-type binary adder employing the multi carry propagation scheme can be predicted with the sum of add process times of a plurality of sub adders employing respective single carry propagation schemes and composing the mixed-type binary adder employing the multi carry propagation scheme. The amount of used circuits can also be predicted with the sum of the amount of used circuits of a plurality of sub adders employing respective single carry propagation schemes and composing the mixed-type binary adder employing the multi carry propagation scheme.

Accordingly, assuming that an add process delay time of the mixed-type binary adder employing 'I' multi carry propagation schemes is T, T is expressed by the sum of process times $T_i$ (i is a subscript used to distinguish among 'I' different carry propagation schemes and has range values of 1 to I) of sub adders employing 'I' carry propagation schemes. Similarly, the amount of used circuits A of the mixed-type binary adder employing 'I' multi carry propagation schemes is expressed by the sum of the amount of used circuits $A_i$ of sub adders employing 'I' carry propagation schemes.

Accordingly, T and A can be expressed as follows.

$$T = \sum_{i=0}^{I} T_i$$

$$A = \sum_{i=0}^{I} A_i$$

When the mixed binary adder employing the n-bit multi carry propagation schemes is designed, assuming that a bit width of the adder employing 'I' carry propagation schemes is $n_i$, $$n = \sum_{i=0}^{I} n_i$$

Consequently, when the add process time is positioned within a given delay time interval [1b, ub] according to delay time restriction, an equation for minimizing the amount of used circuit A can be expressed as follows.

A is minimized when the following three conditions are satisfied.

1. $T \geq lb$   Equation 3

2. $T \leq ub$   Equation 4

3. $n = \sum_{i=0}^{I} n_i$   Equation 5

A second method is to design the structure of the mixed-type binary adder such that the delay time is minimized under restrictions on the amount of used circuits that the minimal value of the amount of used circuits is 1b and the maximal value of the amount of used circuits is ub. In an exchange between A and T, the minimization of the delay time is expressed as follows.

T is minimized when the following three conditions are satisfied.

1. $A \geq lb\,A$   Equation 6

2. $A \leq ub\,A$   Equation 7

3. $n = \sum_{i=0}^{I} n_i$   Equation 8

In the above equations, $$T = \sum_{i=0}^{I} T_i$$

$$A = \sum_{i=0}^{I} A_i$$

$$n = \sum_{i=0}^{I} n_i$$

$T_i$ and $A_i$ represent the process time and the amount of used circuits of an adder having a bit width of $n_i$ and employing an i-th carry propagation scheme, respectively, and are derived from actually designed data in connection with a semiconductor processing technique and a bit width, which are utilized in an actual design.

The minimization of the amount of used circuits under the restrictions on the delay time and the minimization of the delay time under the restrictions on the amount of used circuits can be implemented through simulation annealing, a heuristic algorithm such as a genetic algorithm, and linear programming.

Hereinafter, the present invention will be described by way of an experimental example.

EXPERIMENTAL EXAMPLE

As an optimal experimental example, a design curve for the relationship between the delay time and the amount of used circuits is prepared by linearly combining the ripple carry adder, the carry skip adder and the carry lookahead adder. The ripple carry adder is very slow its operational speed although the amount of used circuits thereof is small, and the carry lookahead adder is very fast in its operational speed although the amount of used circuits thereof is large. The carry skip adder is positioned between the ripple carry adder and the carry lookahead adder in the operational speed and the amount of used circuits. Equations 3, 4 and 5 are coded by an integer linear program, which is one of optimization methods used commonly. This coded equations are used to search an adder structure having the smallest amount of used circuits within a given process time range.

Figure 1:
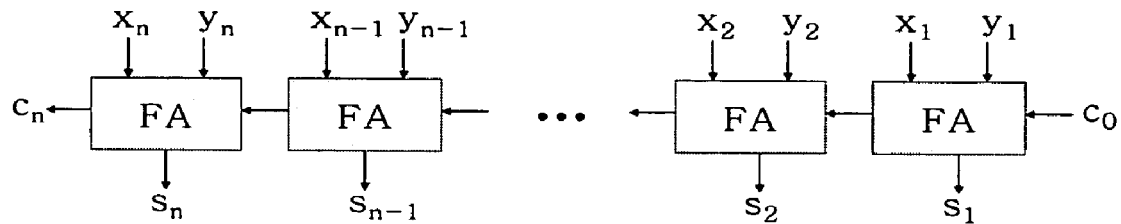
FIG. 1 is a block diagram of a conventional ripple carry adder.
Figure 2:
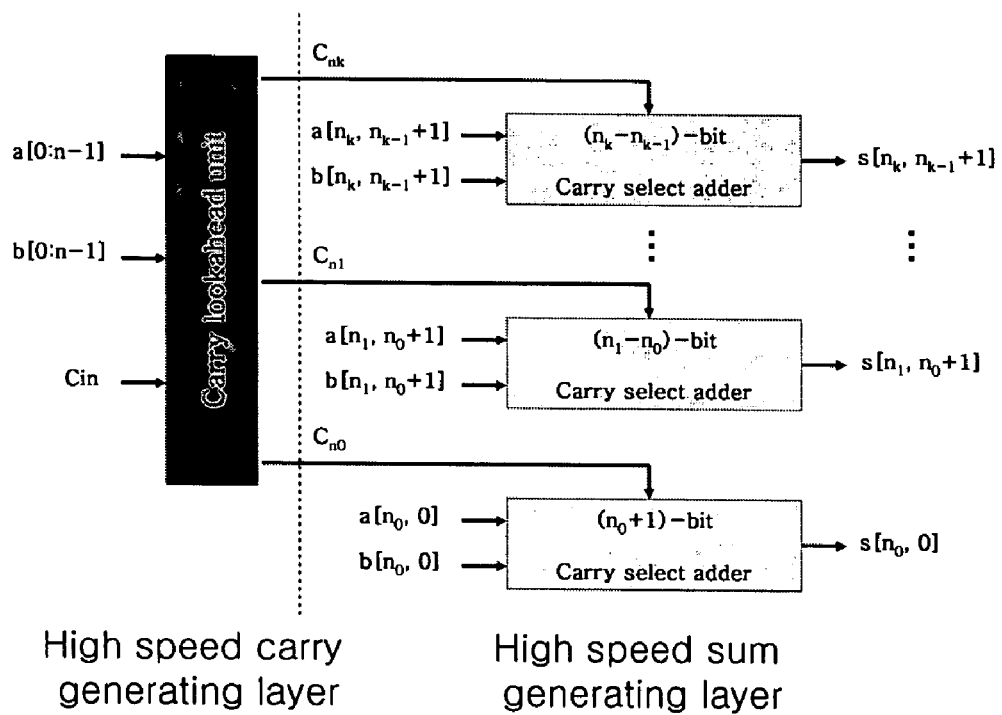
FIG. 2 is a diagram showing a structure of conventional two carry propagation schemes
Figure 3:
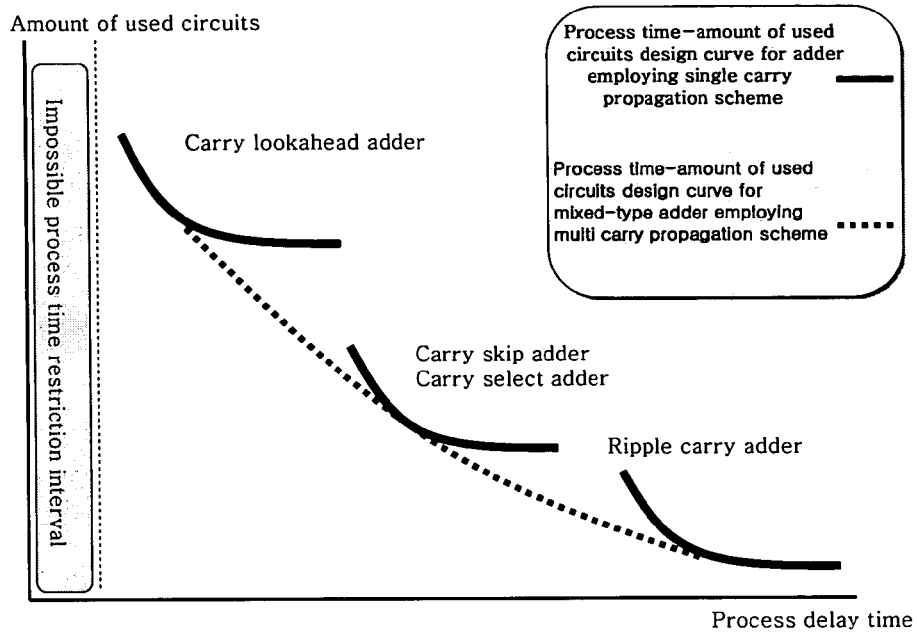
FIG. 3 is a graph showing a design space created according to a conventional adder design scheme and a design space created according to the present invention.
Figure 7:
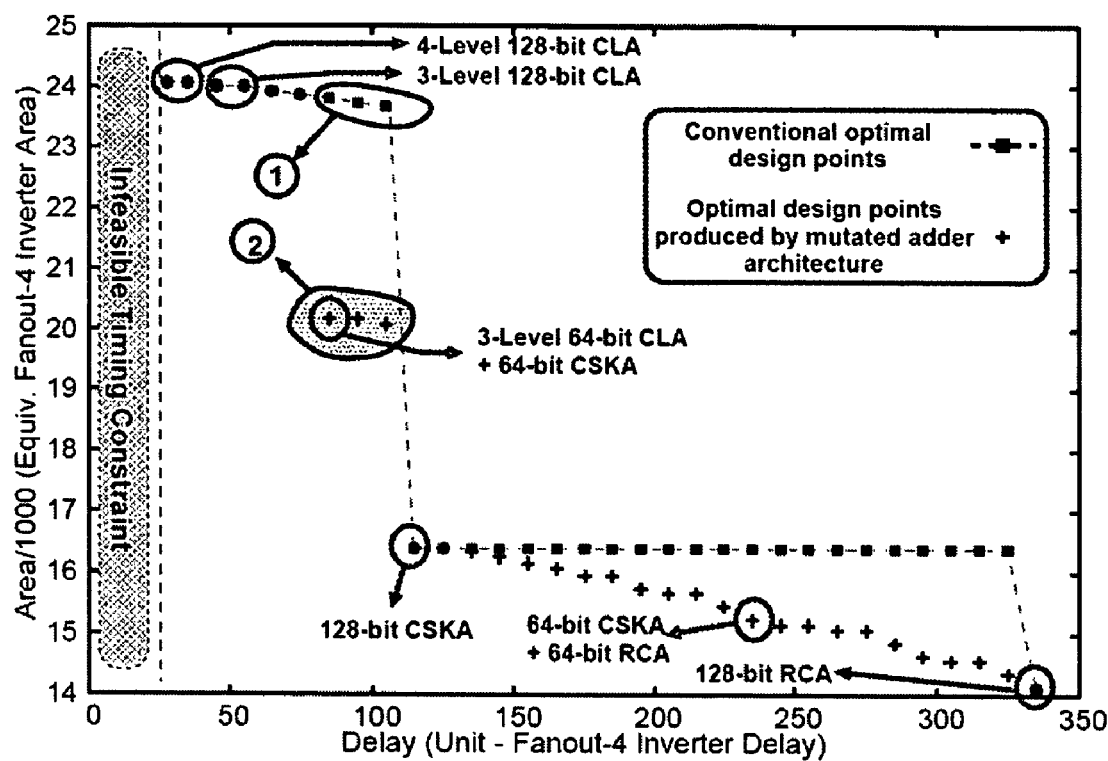
FIG. 7 is a diagram showing a curve for providing a trade-off between the amount of used circuits and the process time of a 128 bits mixed-type binary adder, as an experimental example of the present invention.

FIG. 7 is a diagram showing a curve for providing a trade-off between the amount of used circuits and the process time of a 128 bits mixed-type binary adder, which is provided to show a merit of the adder according to the present invention. In the figure, a horizontal axis represents the process time in the unit of propagation time of a fanout-4 inverter and a vertical axis represents the amount of used circuits in the unit of amount of used circuits of the fanout-4 inverter. Points indicated by '+' correspond to a design plotted by the dotted line in FIG. 3, showing optimization designs created according to the present invention. Points indicated by '■' correspond to the designs plotted by the solid lines in FIG. 3, showing designs created according to existing design schemes. The optimal design points indicated by '+' are generated through a combination of the ripple carry adder, the carry skip adder and the carry lookahead adder for implementing an optimal adder design as shown in FIG. 7. In FIG. 7, a set of optimal designs indicated by ② includes design created according to the present invention. Under the same restrictions on the process time, the set of optimal designs indicated by ② according to the present invention has the amount of used circuits smaller than that of a set of designs indicated by ①, which is created according to the existing design schemes. Similarly, within a range of 140 to 240 (in the unit of propagation time of the fanout-4 inverter) of the process time, it can be seen that the mixed-type binary adder has the small amount of used circuits, compared to the existing design schemes.

As apparent from the above description, by using the structure of the mixed-type binary adder employing the multi carry propagation scheme and the optimization method thereof according to the present invention, an adder having the optimal amount of used circuits under given restrictions on the process delay time or the fastest process delay time under given restrictions on the amount of used circuits can be implemented.

Accordingly, by supporting a majority of a digital system design with adders having an optimal performance for low design costs, it is possible to provide a system design efficient for the system performance and the amount of used circuits.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mixed-type adder wherein when an overall bit width of a mantissa and a summand is n, the overall bit width is divided into I bit groups (where, I is a positive number larger than 1), which are respectively allocated to I sub adders in sequence, the I sub adders having different carry propagation schemes, the respective sub adders including:

a carry input unit Cin that linearly receives carry signals transferred from a previous adder;

a carry output unit Cout that performs an addition operation of allocated bit values and the carry input signals and then linearly outputs the generated carry signals to a subsequent adder in the different carry propagation schemes; and a sum output unit that outputs a sum added in the respective adders;

wherein the mixed-type adder uses an adder intellectual property (IP) having bit width parameters adjusted such that the sum of width of I bits is the overall bit width.

2. The mixed-type adder as set forth in claim 1, wherein each of the sub adders is represented in any one scheme in a group consisting of 0 to (R-1) in a case of a specific natural number, including 0 and 1 in a case of a binary number that is a digital representation scheme.

3. The mixed-type adder as set forth in claim 1, wherein each of the sub adders is selected from a group consisting of a Ripple Carry Adder (RCA), a Carry Skip Adder (CSKA), a Carry Select Adder, a Carry Look-ahead Adder (CLA), a Carry Look-ahead Tree Adder (CLTA), a Conditional Sum Adder (CSA), a Brent-kung adder, and a Prefix Adder (PA).

4. The mixed-type adder as set forth in claim 1, wherein the mixed-type adder satisfies the following condition to minimize the amount of used circuits (A):

$$lb\_T \leq T \leq ub\_T$$

$$n = \sum_{i=0}^{I} n_i$$

where, $lb\_T$ is the minimal delay time, $ub\_T$ is the maximal delay time, T is an add operation delay time of the mixed-type adder, n is the overall bit width, and $n_i$ is a bit width of each sub adder.

5. The mixed-type adder as set forth in claim 1, wherein the mixed-type adder satisfies the following condition to minimize an add operation delay time (T):

$$lb\_A \leq A \leq ub\_A$$

$$n = \sum_{i=0}^{I} n_i$$

where, $lb\_A$ is the minimal amount of used circuits, $ub\_A$ is the maximal amount of used circuits, A is the amount of used circuits of the mixed-type adder, n is the overall bit width, and $n_i$ is a bit width of each sub adder.

* * * * *